Nov. 14, 1967    R. B. BUONAIUTO    3,351,979
APPARATUS FOR WETTING AND FEEDING PLASTIC BEADS INTO A MOLD
Filed Sept. 9, 1965    5 Sheets-Sheet 1
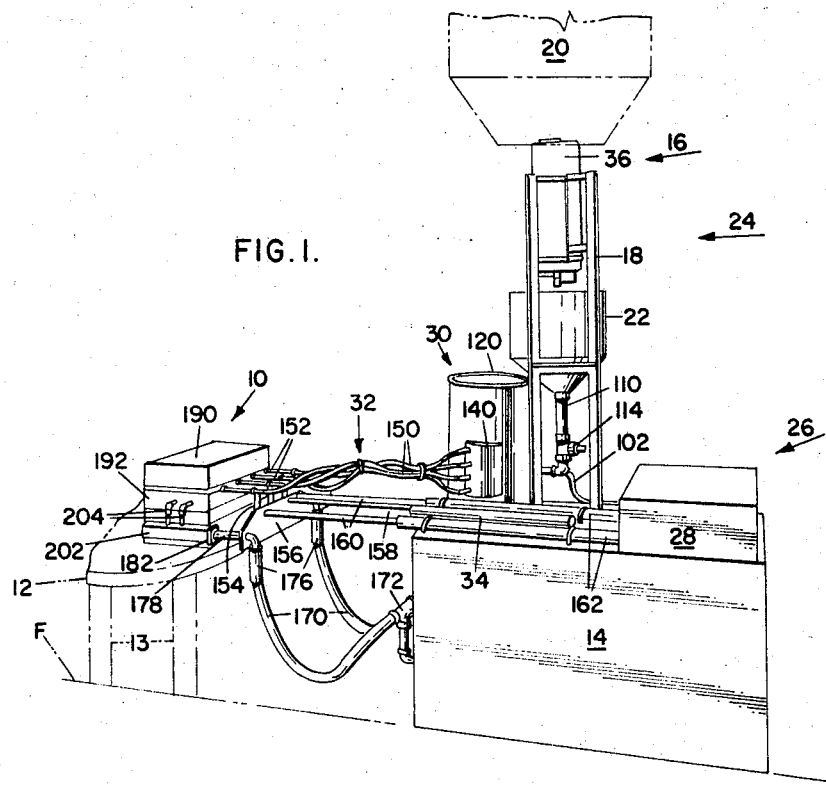
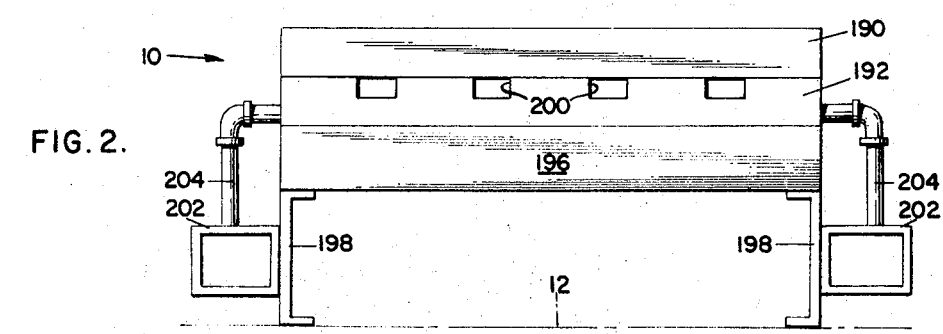
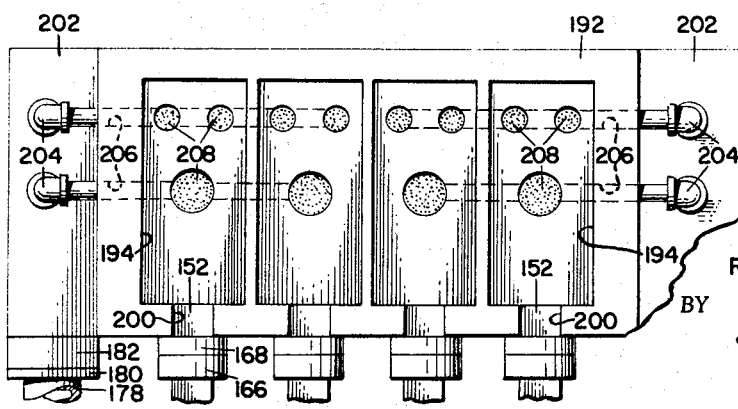
*INVENTOR.*
ROBERT B. BUONAIUTO
BY Kenwood Ross
ATTORNEY.

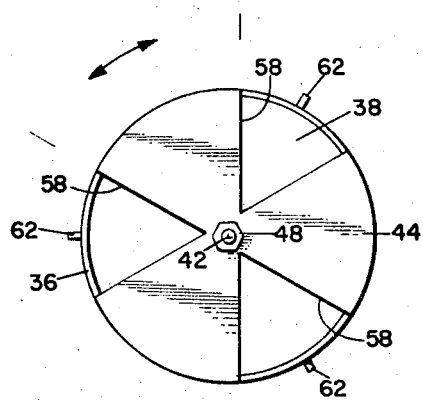
FIG. 5.
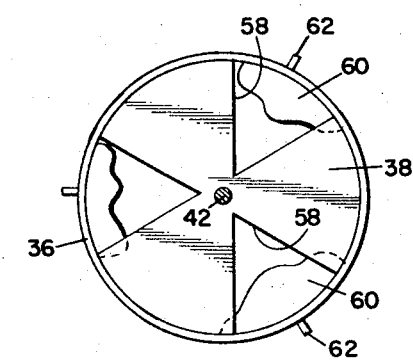
FIG. 6.
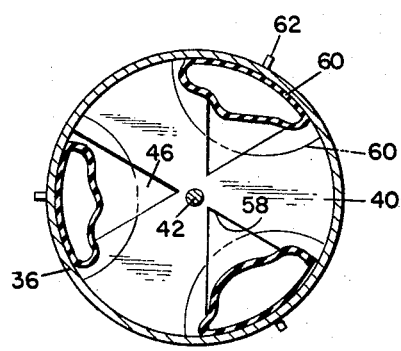
FIG. 7.
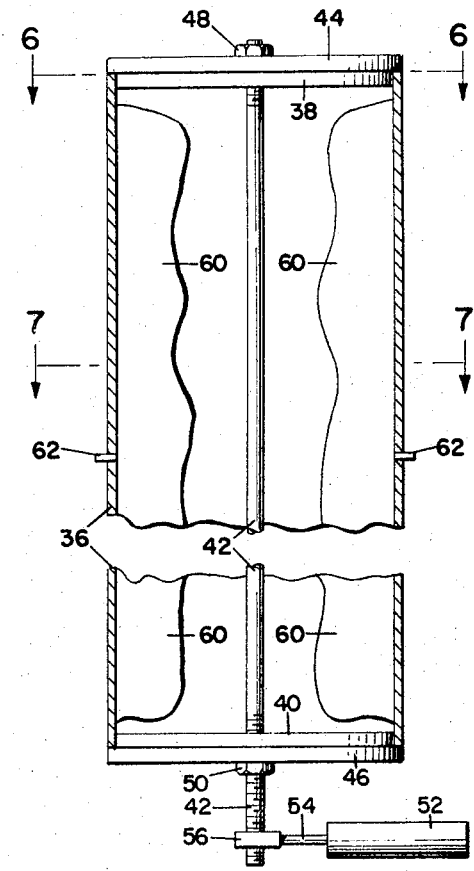
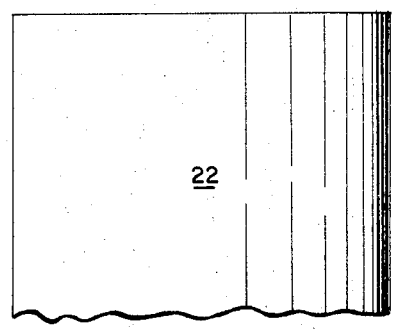
FIG. 4.

INVENTOR.
ROBERT B. BUONAIUTO
BY Kenwood Ross
ATTORNEY.

FIG. II.

INVENTOR.
ROBERT B. BUONAIUTO
BY Kenwood Ross
ATTORNEY.

United States Patent Office 3,351,979
Patented Nov. 14, 1967

3,351,979
APPARATUS FOR WETTING AND FEEDING
PLASTIC BEADS INTO A MOLD
Robert B. Buonaiuto, 3 McLean Parkway,
Ludlow, Mass. 01056
Filed Sept. 9, 1965, Ser. No. 485,991
7 Claims. (Cl. 18—5)

My invention relates to plastic mold feeding apparatus and is directed more particularly to such apparatus as will deliver an exact amount of properly preconditioned thermoplastic polymeric materials, such as polystyrene, to a mold cavity or cavities.

As is known, a variety of thermoplastic polymeric and resinous materials, such as polystyrene, may be expanded or foamed from a granular or bead or pellet form to assume a porous, cellular, solidified foam-like structure. A propellant or blowing agent (a gas generating substance or a fugacious liquid) incorporated in the beads, granules or pellets expands them under the application of heat by causing the propellant or blowing agent to be released or thermally expanded (or both) whilst the thermoplastic material softens as it attains a foaming temperature. The pressure of the thermally expanding blowing agent expands the thermoplastic material into the desired foam structure. The heat energy required to soften the resinous material and to release the blowing agent for the foam forming function may be derived from an externally generated source of radio frequency (RF) heat.

As is known, such beads are transparent to RF heat. The application of wetting agents and moisture to the beads absorbs and conducts this RF heat. The RF waves heat the moisture on the beads, which moisture is converted to steam, thereby heating the beads and causing their expansion and fusion. Desirably, each and every bead is provided with a uniform coating of wetting agent and moisture. Further desirably, they should have the same amount of wetting agent for every load or charge. Otherwise, uneven heating will occur, resulting in underfusing and crumbling or overheating and collapsing of the foam.

Accordingly, it is a primary object of my invention to provide automatic means for delivering to a mold an exact amount of such beads or pellets necessary to fill the mold cavity or cavities, said beads having been properly preconditioned by the addition of the exact amount of the wetting agent to insure the production of molded articles having not only a uniform core of cellular polymeric or foam plastic material but also an outermost skin or surface which is equally uniform.

Broadly stated, the mold feeding apparatus of my invention comprises, a bead metering unit, a blowing or wetting agent metering unit, a blending unit, and a coupling unit for delivering a proper amount of properly preconditioned beads or pellets to the mold cavity or cavities.

These and other objects will be more fully apparent from a consideration of the following detailed description of my apparatus when read in conjunction with the annexed drawings, in which:

FIG. 1 is a perspective view of mold feeding apparatus embodying the invention;

FIG. 2 is a front elevational view of a typical two-part multi-cavity mold with which the mold feeding apparatus of the invention will be employed;

FIG. 3 is a top plan view of the bottom mold part of the mold of FIG. 2, with the coupling means of the apparatus of the invention in mold-filling position;

FIG. 4 is an elevational view of the bead metering unit of the apparatus of the invention, portions having been broken away for purposes of clarity;

FIG. 5 is a top plan view of the bead metering unit of FIG. 4, certain components having been omitted for purposes of simplicity;

Figure 8:
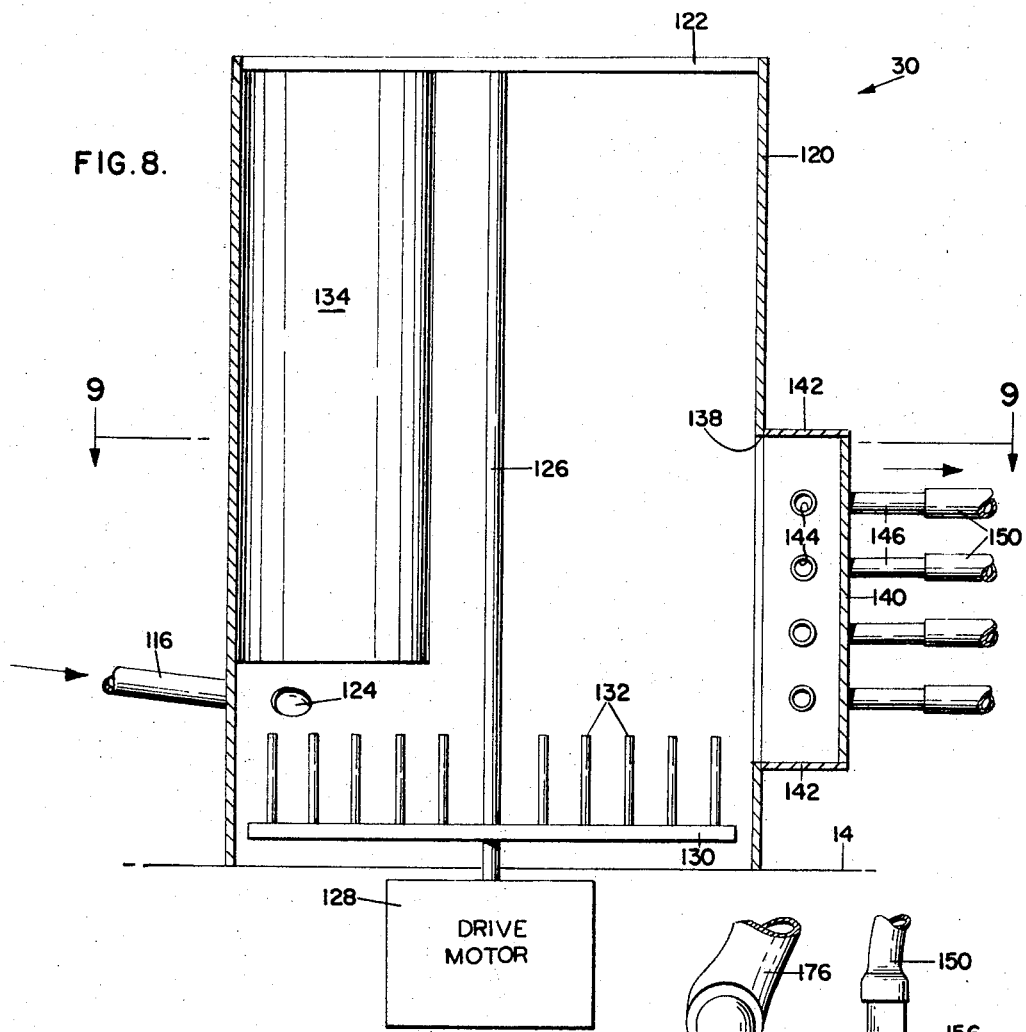
Figure 9:
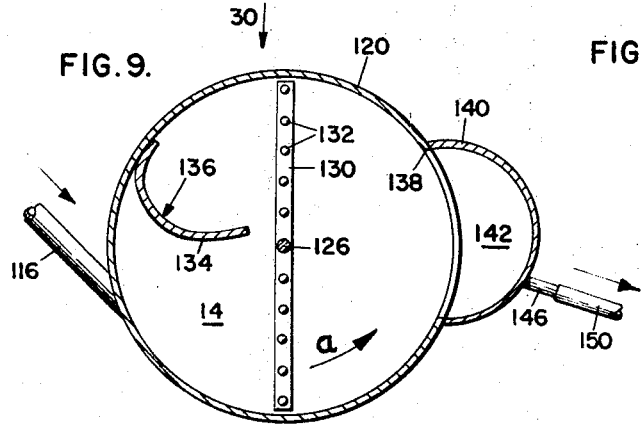
Figure 10:
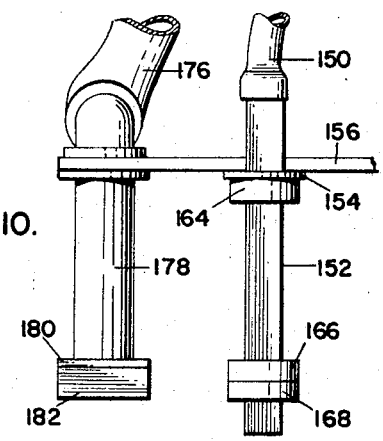
Figure 11:
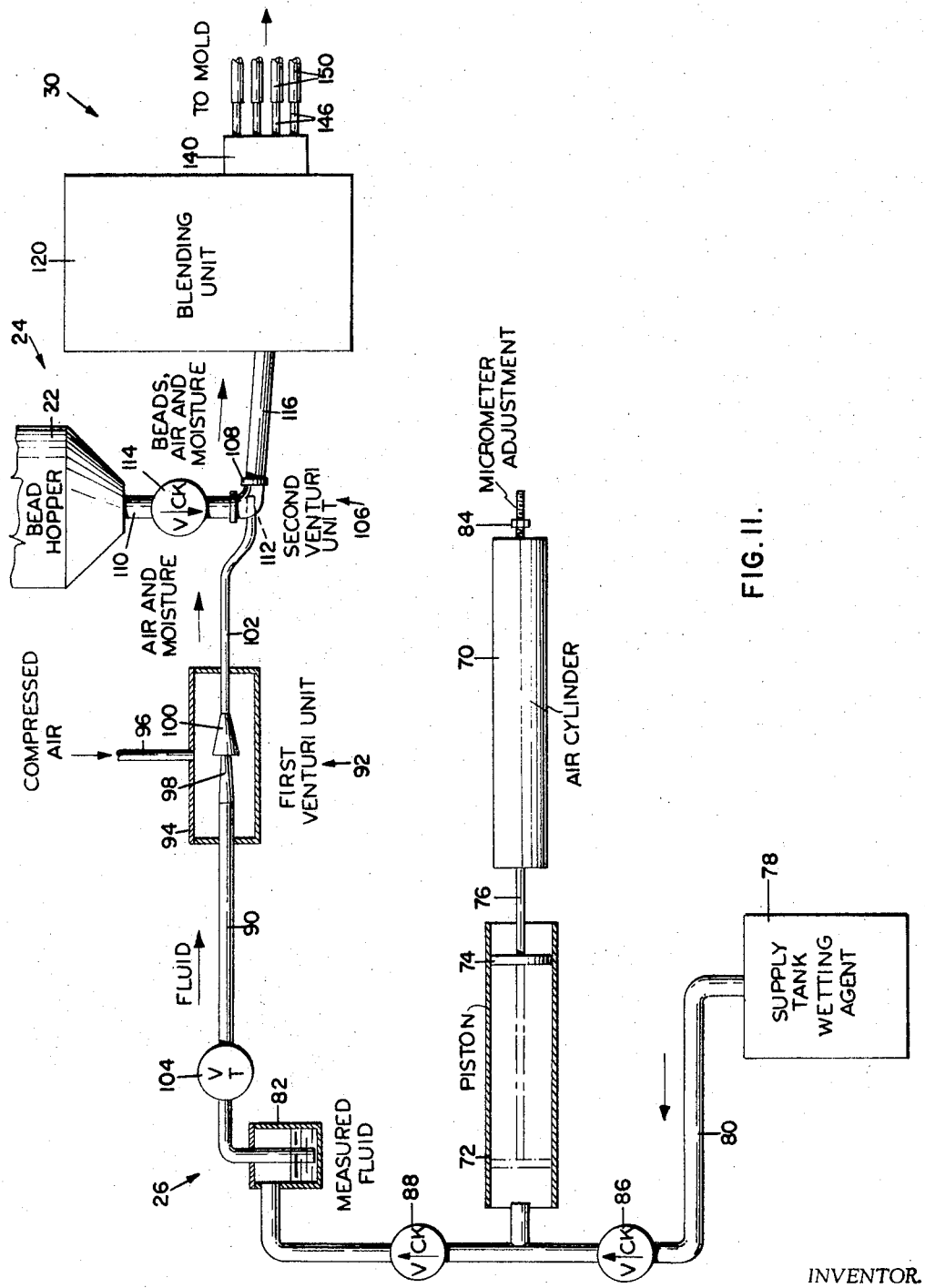
Figure 12:
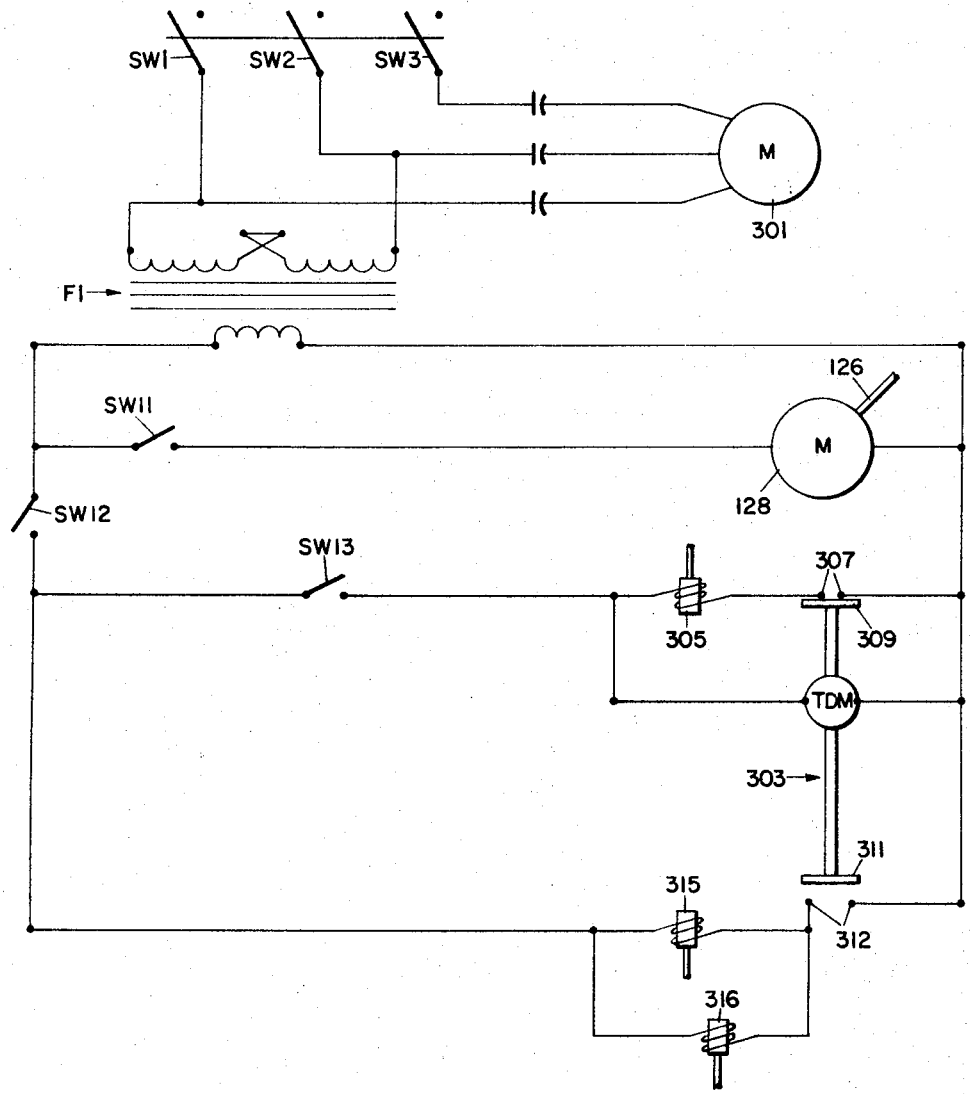

FIGS. 6 and 7 are sectional views on the lines 6—6 and 7—7 respectively of FIG. 4, certain components having been omitted for purposes of simplicity;

FIG. 8 is an elevational view of the blending unit of the apparatus of the invention, portions having been broken away for purposes of clarity;

FIG. 9 is a transverse cross sectional view on lines 9—9 through the blending unit of the apparatus of FIG. 8;

FIG. 10 is an enlarged fragmentary top plan view of a portion of the coupling unit of the apparatus of the invention;

FIG. 11 is a diagrammatic representation of the fluid metering unit of the apparatus of the invention and its manner of integration into the bead supply system of the apparatus of the invention; and FIG. 12 is a schematic control diagram for the automatic operation of the apparatus of the invention.

With detailed reference now to the drawings, I have shown in FIG. 1 mold feeding apparatus embodying the invention, and disposed in coupled, operative, mold-feeding relationship to a two-part, multi-cavity mold. It should be noted that while a four-cavity mold is shown in the drawings, my invention may be adapted to fill a single cavity mold or any number of mold cavities.

The mold, generally indicated by 10, will be basically of the type described in my copending application, Ser. No. 410,247 filed Nov. 10, 1964, and will be one of a plurality of such molds strategically spaced about the upper surface of a rotatable table 12 supported upwardly of the floor F as by legs 13 or equivalent.

Table 12 being rotatable, molds 10 are delivered in timed sequence to various stations, one of which is the mold filling station, with which the present invention is directly concerned. At such mold filling station, the desiderata are as follows: (a) to couple the mold feeding apparatus to the mold; (b) to deliver the correct quantity of properly wetted, correctly preconditioned beads to the mold cavity or cavities; (c) to uncouple the mold feeding apparatus from the mold so that the mold may be rotated to its next station; and (d) to accomplish all of the above in a predetermined time interval.

These desiderata are accomplished by the mold-feeding apparatus of the invention, which comprises, generally, a bead metering unit, a fluid or wetting agent metering unit, a blending unit, and a coupling unit, all now to be more fully described.

The mold-feeding apparatus is supported upwardly of the floor F by a cabinet or table 14 which also serves to house the various compressors, motors and control apparatus which motivate the feeding apparatus. Since these units in housing 14 are in part conventional, they have not been shown in the drawings in great detail. Their novel combination is shown in the schematic drawing of FIG. 12.

The bead metering unit, generally indicated by 16, is supported upwardly of the upper planar surface of cabinet 14 by suitable bracketing 18 so as to be disposed between and in axial alignment with a main bead supply hopper 20 disposed thereabove, and an auxiliary bead supply hopper 22 disposed therebelow. The hoppers 20 and 22 and bead metering unit 16 form, in combination, a bead supply unit generally indicated by 24.

The fluid or wetting agent metering unit, generally indicated by 26, is enclosed for the most part within a housing 28 disposed upon the upper surface of cabinet 14, metering unit 26 being linked to bead supply unit 24 in manner as will appear.

The blending unit, generally indicated by 30 and the coupling unit generally indicated by 32 are each also disposed upon the upper surface of cabinet 14, with blending unit 30 being disposed between and linked to both of bead supply unit 24 and coupling unit 32, and with the latter being movable into and out of mating contact with mold 10 by means of a hydraulic cylinder 34, all more fully to be described hereinafter.

Bead metering unit 16 insures the fulfillment of the desideratum that the correct quantity of beads is delivered to the mold cavity or cavities. Such is accomplished by the novel combination within a metering tank of gates to meter the delivery of the desired amount of beads from main bead supply hopper 20, and their delivery into auxiliary bead supply hopper 22. Metering is readily effected by equipping the auxiliary bead supply hopper with air containers fixed to the tank interior wall, such being inflatable and deflatable to vary and/or control the capacity of the tank.

Referring now to FIGS. 4-7, bead metering unit 16 will be seen to comprise a cylindrical, hollow, vertically-disposed tank 36 having flat, apertured disc-like gates 38 and 40 fixedly and non-rotatably secured within the bore thereof at the opposite upper and lower ends thereof respectively. A vertically-extending shaft 42 is disposed along the vertical central axis of tank 36 and has opposite upper and lower ends freely rotatable in and extending outwardly of appropriately aligned central openings provided in fixed gates 38 and 40 respectively.

An upper and movable flat, apertured, disc-like gate 44, substantially identical to fixed upper gate 38, is superposed upon the latter so as to be in face-to-face bearing contact therewith, and rests adjacent its outer circumferential edge upon the upper end of tank 36. The upper end of shaft 42 extends, in press-fitted or otherwise secured within the central opening provided in upper movable gate 44, wherefore gate 44 is movable as shaft 42 is rotated.

A lower and movable flat, apertured, disc-like gate 46, substantially identical to fixed lower gate 40, is disposed below the latter so as to be in face-to-face bearing contact therewith and to bear adjacent its outer circumferential edge upon the lower end of tank 36. The lower end of shaft 42 extends in the manner of a press-fit, through a central opening provided in lower movable gate 46 wherefore gate 46 is movable therewith as shaft 42 is rotated. Nuts 48 and 50 threaded upon the upper and lower ends respectively of shaft 42 bear upon upper and lower movable gates 44 and 46 respectively wherefore the shaft is securely positioned relative to tank 36.

Rotation of shaft 42 through an arc of approximately 60° is effected by the actuation of an air cylinder 52 disposed below tank 36 and having a piston shaft 54 extending outwardly therefrom and secured at its outermost end to a collar 56 fixedly secured to the lower end of shaft 42, wherefore linear movement of the piston shaft is translated to rotative movement of shaft 42. As aforesaid, gates 44 and 46 are movable concomitantly with shaft 42. Each of the gates 38, 40, 44 and 46 is provided with an equal number of substantially identical, equally-spaced, wedge-shaped openings 58 which extend inwardly from the outer circumferential edge thereof.

Each of the gates is so disposed upon shaft 42 that upon rotation of shaft 42 in one direction the openings 58 in movable upper gate 44 are brought into registration with the openings 58 in fixed upper gate 38 to permit passage of beads from main supply hopper 20 through the passageways formed by the so-registered openings 58 into tank 36. Concomitantly, upon such movement of shaft 42 in said one direction, the openings 58 in lower movable gate 46 are moved out of registration with the openings 58 in lower fixed gate 40 to effectively seal off the lower end of tank 36 thereby precluding the passage of beads from tank 36 to auxiliary supply hopper 22 disposed therebelow. Rotation of shaft 42 in an opposite direction seals the upper end of tank 36 by moving the openings 58 in upper movable gate 44 out of registration with openings 58 in upper fixed gate 38, while concomitantly moving the openings 58 in lower movable gate 46 into registration with the openings 58 in lower fixed gate 40, permitting beads to drop from tank 36 through the thus formed passageways into auxiliary hopper 22.

A plurality of elongated, balloon-like air containers 60, which may be fabricated from rubber or plastic or like material are disposed within tank 36 and are fixed to the interior wall of said tank by any suitable means at spaced points therearound. Each of said containers is provided with a suitable valve means 62 which extends outwardly through provided openings in the wall of tank 36, thereby permitting air to be pumped into or released from said containers. Containers 60 will be of a length substantially equal to that of tank 36 and, upon appropriate inflation or deflation thereof, will vary the bead capacity of tank 36. The air containers 60, together with the system of gates above described, makes it possible to measure and control, to a minute degree, the quantity of beads delivered to auxiliary hopper 20, this quantity being the exact quantity, and no more, that is required to fill the cavity or cavities of mold 10.

Fluid or wetting agent metering unit 26 insures the achievement of the desideratum that the correct amount of wetting agent or fluid is available for admixture with that quantity of beads which has been released to auxiliary hopper 22 by bead metering unit 16. It is to be understood that for a given quantity of beads an exact amount of wetting agent is required to place the beads in proper condition for molding, and that if too much or too little wetting agent is added, proper molding cannot take place. Evaporation of the wetting agent from the moistened beads will impair the mixture ratio and is avoided by the method of this invention of mixing small quantities of beads and wetting agent.

The various components of fluid or wetting agent metering unit 26, which are disposed, for the most part, within housing 28 upon the upper surface of cabinet 14, are best seen in FIG. 11. Included are an air cylinder 70 linked to a pump 72 which may be in the form of transparent, graduated cylinder closed at its ends and having a piston 74 and piston shaft 76 of air cylinder 70 slideably disposed therein. Pump 72 serves to draw the fluid or wetting agent from a main supply tank 78 disposed within cabinet 14 and into a pipeline 80 which connects between supply tank 78, pump 72 and a small, closed fluid container 82.

Air cylinder 70 carries micrometer adjustment means 84 wherefore the effective length of the stroke of its piston shaft 76 and piston 74 within pump 72 may be varied. A first check valve 86 is disposed in pipeline 80 between pump 72 and tank 78, and a second check valve 88 is disposed in pipeline 80 between pump 72 and container 82, both of these valves normally being closed.

On the pull stroke of piston 76, to the right as viewed in FIG. 11, a vacuum is created in pump 72 to open first valve 86 and to draw a measured amount of fluid from tank 78. On the push stroke of piston 76, to the left as viewed in FIG. 11, first valve 86 is closed and second valve 88 is opened wherefore the measured amount of fluid previously drawn from tank 78 is propelled into container 82. The amount of fluid now present in container 82 is the exact amount necessary for the proper wetting of that quantity of beads present in auxiliary hopper 22.

A pipeline 90 connects between container 82 and a first venturi unit generally indicated by 92. First venturi unit 92 comprises a closed container 94 having a compressed air line 96 leading thereinto, said container housing a nozzle-like tapered end 98 of pipeline 90 and a flared bell-like end 100 of a pipeline 102 connected at its opposite end to auxiliary hopper 22 in manner to be described.

A needle valve 104 is disposed in pipeline 90 between fluid container 82 and first venturi unit 92. When needle valve 104 is opened and compressed air is delivered to first venturi unit 92 through air line 96, a suction is created within pipeline 90 to draw the fluid out of container 82, along pipeline 90 and into pipeline 102, at which point the fluid has changed to a mixture of air and moisture.

A second venturi unit, generally indicated by 106, includes an elbow 108 coupled to a downspout 110 leading from the lower end of auxiliary hopper 22 and an outermost end 112 of pipeline 102 which is disposed within elbow 108. A manually operable check valve 114 is disposed along downspout 110 between auxiliary hopper 22 and second venturi unit 106, check valve 114 being normally partly opened to permit the controlled descent of beads along downspout 110 from the hopper. The end 112 of pipeline 102 being positioned within elbow 108, the mixture of compressed air and moisture emanating from said end 112 creates a suction to draw beads downwardly through downspout 110 and elbow 108 into a connecting line 116 connecting between elbow 108 and blending unit 30. In this manner, all of the beads are drawn from hopper 22 and a mixture of beads and moisturized air is delivered to blending unit 30.

Blending unit 30, best seen in FIGS. 8 and 9, includes a hollow, drum-like outer shell 120 which rests upon cabinet 14 and which is closed at its upper end as by an annular cover member 122. Connecting line 116 leading from second venturi unit 106 leads into blending unit 30 through an opening 124 provided in shell 120 adjacent the lower end of the latter. A vertically-extending shaft 126 connected at its lower end to a drive motor 128 positioned within cabinet 14 below blending unit 30 is disposed along the longitudinal central axis of shell 120 and is journalled at its upper end in a suitably aligned opening or hub (not shown) provided in cover member 122. A bar, 130, which is fixed to shaft 126 within shell 120, extends transversely relative to shaft 126 adjacent the lower end of shell 120 so as to be disposed slightly above the plane of cabinet 14 and immediately below the opening 124. Bar 130 carries a plurality of spaced upright fingers or vanes 132 on its uppermost surface.

Upon rotation of shaft 126, bar 130 and its integral fingers or vanes are rotated therewith. Moisturized beads coming into shell 120 through opening 124 drop directly onto the rotating vanes, which will be moving at a relatively high rate of speed, say between 400 and 500 r.p.m., wherefore the beads are subjected to violent agitation. A baffle 134, in the form of a longitudinally-extending arcuate plate, is secured along one of its side edges to the inner surface of shell 120 above bar 130 and vanes 132, and presents a concave face 136 to the beads which are being propelled generally in the direction of arrow $a$ in FIG. 9, wherefore the beads, upon contact with face 136, are directed to the center of the shell for better agitation somewhat in the manner of a vortex.

The properly blended beads escape from shell 120 through an opening 138 provided in the shell and enclosed by a generally semi-circular in cross-section sub-housing 140 which is fixed to and protrudes outwardly from the outer peripheral surface of the shell, sub-housing 140 being closed at its upper and lower ends as by plates 142 which are also fixed to shell 120. A plurality of spaced openings 144 provided in the sub-housing 140 receive one end of tubular couples 146 which are each connected at their opposite ends to flexible bead tubes 150 which form part of the coupling unit 32, shortly to be described.

Sub-housing 140 permits the build-up of a reservoir of beads immediately adjacent the flexible bead tubes 150 making bead withdrawal quite simple. If bead tubes 150 were tapped directly into shell 120, it could be difficult to draw the beads from the shell because the beads are travelling at such a high rate of speed.

As aforesaid, flexible bead tubes 150 form part of coupling unit 32, by means of which the mold feeding apparatus is coupled to mold 10 to feed the now properly blended and conditioned beads into the mold cavity or cavities. Coupling unit 32, best seen in FIGS. 1 and 10, includes in addition to flexible bead tubes 150, a plurality of generally rectangular-in-cross-section, hollow and rigid mold connecting tubes 152, each sleeved within the outer free end of one of said flexible bead tubes 150.

Connecting tubes 152 are fixed to upright brackets 154 which are adjustably secured to and extend upwardly from a support plate 156 which is in turn fixed to the outer free end of a piston shaft 158 of hydraulic cylinder 34, it being recalled that cylinder 34 is disposed upon and fixed to the upper surface of cabinet 14. Support plate 156 is additionally fixed to the outer free ends of stabilizer bars 160 which are horizontally reciprocable within and relative to stabilizers 162 provided on each side of cylinder 34 and also fixed to cabinet 14.

Each of the connecting tubes 152 is fixed to its bracket 154 by a collar 164 tightly sleeved upon the tube and attached to the bracket by any suitable means. An additional collar 166 is sleeved upon each connecting tube 152 adjacent the outermost free end thereof, said collar having a resilient bumper 168 secured to its outwardly facing face and sleeving its respective tube 152 for purposes to appear.

Plate 156 additionally supports the outer ends of a pair of flexible vacuum lines 170 which are connected at their opposite ends to a T-coupling 172 which also connects to a vacuum supply line 174 leading to a compressor (not shown), disposed within cabinet 14. The outer ends of vacuum lines 170 are sleeved within one end of hollow couples 176 which receive therein at their opposite ends the ends of rigid, vacuum connecting tubes 178.

A generally rectangular plate 180 is sleeved upon and fixed to each vacuum connecting tube adjacent the outermost free end thereof, said plates each having a generally rectangular resilient bumper 182 secured to its outwardly facing face and sleeving its respective vacuum connecting tube 178 for purposes to appear. Coupling unit 32 is reciprocated horizontally toward and away from mold 10 by reciprocation of piston shaft 158 of cylinder 34, flexible bead tubes 150 and flexible vacuum lines 170 permitting such reciprocation.

Referring to FIGS. 2 and 3, mold 10 is comprised of upper and lower mold parts 190 and 192 respectively. The mold parts define therebetween in the closed position a plurality of mold cavities 194 supported upwardly of rotatable table 12 by a base 196 mounted upon brackets 198 fixed to the upper surface of said table. That side wall of lower mold part 192 facing toward coupling unit 32 is provided with spaced, generally rectangular passageways 200 which extend inwardly from said side wall and terminate at their innermost ends at the mold cavities 194.

Passageways 200 are of appropriate size and disposition as to receive therein the outermost free ends of mold connecting tubes 152 in the closed position of mold parts 190 and 192 upon appropriate outward reciprocation of coupling unit 32 under the impetus of cylinder 34. Buffers 168 tightly bear upon the adjacent side faces of said mold parts, whereby beads may be delivered from bead tubes 150 into said mold cavities as will appear.

A pair of hollow vacuum manifolds 202 are fixed to brackets 198 and face toward coupling unit 32. Said manifolds are so spaced and disposed as to receive thereagainst the outermost free ends of vacuum connecting tubes 178 upon outward reciprocation of coupling unit 32, with the buffers 182 bearing tightly upon the adjacent ends of said manifolds, thereby providing a seal between tubes and manifolds. Couples 204 connect manifolds 202 to vacuum passages 206 provided in lower mold part 192 and which extend inwardly from the side walls of said mold part to the mold cavities 194. Shields 208, which may be in the nature of plastic plugs having a plurality of minute openings therein, are disposed in the cavities 194 and extend into the passages 206 to effectively preclude the blockage of said passages by beads or other foreign matter.

To fill the mold cavities with beads, coupling unit 32 is reciprocated outwardly to bring vacuum connecting tubes 178 into contact with manifolds 202, and to position mold connecting tubes 152 in the passageways 200 of lower mold part 192, whereupon vacuum is applied to vacuum lines 170 and thereby to the mold cavities. The resulting suction upon the open ends of connecting tubes 152 which open into said cavities draws the preconditioned beads from the flexible bead tubes 150 into the mold.

Referring to the bead preparation control circuit of FIG. 12, a three-phase 440 volt power supply is connected across motor 301 through power supply switches SW–1, SW–2 and SW–3. Motor 301 is coupled to a compressor unit for providing the necessary vacuum in vacuum lines 170. A step-down transformed T–1 provides 120 volts for the balance of the control circuit. Motor 128, upon closing of SW–11, will run continuously and is coupled to mixing bar 130 through shaft 126.

A time delay motor and switching mechanism 303 is provided to obtain automatic operation of the bead and wetting agent supply components. Upon closing of switches SW–12 and SW–13 solenoid 305 will be energized when contact points 307 are bridged by the upper time delay switch 309. Solenoid 305, when energized releases compressed air through line 96 into the first venturi unit 92. As previously described, venturi unit 92 will evacuate the measured wetting agent from container 82. The combined air and moisture exiting venturi unit 92 is directed to the second venturi unit 106, thereby evacuating the measured bead supply from bead hopper 22. The mixture of beads and moisturized air is then delivered to blending unit 30.

A second time delay switch 311 bridges contact points 312 when solenoid 305 is de-energized. Bridging of contacts 312 simultaneously energizes solenoids 315 and 316. Upon energization of solenoid 315 compressed air is released into air cylinder 70 to draw a measured quantity of wetting agent into pump 72. Likewise, the energizing of solenoid 316 releases compressed air into air cylinder 52 which opens upper gate 44 and closes lower gate 46 on tank 36. Tank 36 is thereby filled with the desired amount of beads.

When a mold 10 has been filled with moisturized beads, the vacuum valves (not shown) associated with vacuum lines 170 will close. Solenoids 315 and 316 will then be de-energized by the time delay mechanism 303, thereby causing the measured amounts of beads and wetting agent to be delivered from tank 36 and pump 72 into hopper 22 and container 82, respectively. As described heretofore, energized solenoid 305 delivers the measured mixture of beads and moisturized air into contact with beater vanes 132 for complete mixing before filling a mold. This cycle is repeated for each mold as it reaches the filling station.

The approximate time cycle of the molding equipment for which the mold feeding apparatus has been designed will be thirty seconds. The approximate time cycle for the mold feeding apparatus is fifteen seconds. Thus, it is apparent that the synchronization of the feeding apparatus with the molding apparatus is not too difficult since each mold will be at the filling station for a period of thirty seconds, twice the time required to fill the mold.

The entire sequence of operations of my mold filling apparatus is as follows:

(a) Bead metering unit 16 takes a measured amount of unconditioned beads from main bead supply hopper 20;

(b) Simultaneously therewith, at fluid or wetting agent metering unit 26, on the pull stroke of piston 74, a measured amount of fluid is drawn from main supply tank 78, with second check valve 88 remaining closed;

(c) The measured amount of beads drop from bead metering unit 16 into auxiliary supply hopper 22;

(d) Simultaneously therewith, at fluid or wetting agent metering unit 26, on the push stroke of piston 74, second check valve 88 is opened and the measured amount of fluid is delivered through pipeline 80 to fluid container 82;

(e) At fluid or wetting agent metering unit 26, needle valve 104 is opened and compressed air is delivered by air line 96 to first venturi unit 92 to draw the fluid from container 82 and to deliver a mixture of moisturized air to second venturi unit 106;

(f) Second venturi unit 106 draws the previously measured quantity of beads from auxiliary supply hopper 22 and delivers a mixture of moisturized air and beads to blending unit 30;

(g) At blending unit 30, the beads and fluid are subjected to a final blending by agitation;

(h) Coupling unit 32 is moved outwardly toward mold 10 by cylinder 34, bringing vacuum connecting tubes 178 into contact with manifolds 202, and positioning mold connecting tubes 152 in passageways 200 in lower mold part 192;

(i) Vacuum is applied to vacuum lines 170 and thus to mold cavities 194 through passages 206 to draw the measured supply of properly blended and preconditioned beads to the mold cavities; and (j) Coupling unit 32 is backed off from mold 10, the mold is rotated to its next station and the cycle is repeated.

Although only one embodiment of this invention has been disclosed, it will be apparent to those skilled in the art that modifications can be made without departing from the spirit of the invention and the scope of the appended claims.

I claim:

1. Mold filling apparatus adapted for automatically filling a series of molds with individually blended charges of polystyrene beads comprising:

a pair of metering units for measuring a predetermined charge of polystyrene beads and wetting agent into respective containers in automatic response to the filling of a mold;

a blending unit positioned downstream from said containers;

a release means operably associated with exit controls in communication with said wetting agent and bead containers whereby said measured charge of beads and wetting agent are delivered to said blending unit, a time delay mechanism coupled between said release means and said pair of metering units whereby said release means is activated upon de-activation of said pair of metering units;

a bead tube in communication with said blending unit adapted for delivering said charge of blended beads into a successive mold; and whereby said pair of metering units are re-activated and said release means is de-activated automatically repeating the mold filling cycle.

2. The apparatus of claim 1 in which the feeding of a charge of beads into said metering unit is controlled by entry and exit gates in concomitant operation with one of said gates closed when the other gate is open.

3. The apparatus of claim 2 in which auxiliary hopper is connected between said bead metering and bead exit control for receiving said beads prior to their discharge into said blending unit.

4. The apparatus of claim 1 in which said wetting agent metering unit comprises a reciprocable piston pump having a housing in communication with a wetting agent reservoir.

5. The apparatus of claim 4 in which said exit control on said metered wetting agent comprises the controlled passage of compressed air through a first venturi means in communication with a container coupled to said wetting agent metering unit and containing said charge of wetting agent.

6. The apparatus of claim 5 in which a venturi means is coupled to the discharge of said first venturi means and said measured charge of beads, said venturi means being further coupled to said blending unit for transmission of moistened beads thereto.

7. In an apparatus for molding foamed polystyrene articles, mold filling apparatus adapted to fill a series of molds comprising:
- a metering bead unit connected to a main hopper containing polystyrene beads in dry form;
- an auxiliary hopper in bead transmitting complement with said metering unit;
- barrier means between said main hopper and metering unit and at an exit of said metering unit responsive to the travel of molds relative to said filling apparatus for transmitting a predetermined quantity of beads into an auxiliary hopper;
- a metering wetting agent unit with valve means simultaneously responsive with said barrier means whereby a predetermined quantity of wetting agent is withdrawn from a reservoir into said metering wetting agent unit and transmitted therefrom to a fluid container;
- an exit conduit coupled to said fluid container and containing a first venturi unit;
- means connected to said first venturi unit for introducing compressed air therein upon filling of said fluid container agent unit thereby causing moisturized air to flow through a conduit from said fluid container to a second venturi;
- said second venturi further coupled to said auxiliary hopper for receiving said metered quantity of beads simultaneous with passage of said metered quantity of moisturized air;
- and a conduit leading from said second venturi to a blending unit for transmitting said measured mixture of moisturized beads into a blending unit.

References Cited
UNITED STATES PATENTS

| | | | |
|---|---|---|---|
| 3,104,424 | 9/1963 | Immel | 18—30 |
| 3,217,691 | 11/1965 | Jablmski | 118—303 |
| 3,251,092 | 5/1966 | Printz | 18—5 |

J. SPENCER OVERHOLSER, *Primary Examiner.*

WILBUR L. McBAY, *Examiner.*